(12) United States Patent
Kitamura

(10) Patent No.: US 6,418,041 B1
(45) Date of Patent: Jul. 9, 2002

(54) BICYCLE POWER SUPPLY

(75) Inventor: Satoshi Kitamura, Kitakatsuragi-gun (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/722,089

(22) Filed: Nov. 22, 2000

(30) Foreign Application Priority Data

Feb. 29, 2000 (JP) ........................................ 2000-053334

(51) Int. Cl.[7] .............................. H02M 7/00; B62J 6/00; H01K 7/00
(52) U.S. Cl. .......................... 363/125; 362/473; 315/76
(58) Field of Search ............................ 363/125, 59, 60, 363/61, 89; 362/193, 473; 315/77, 76, 78

(56) References Cited

U.S. PATENT DOCUMENTS

| | | | |
|---|---|---|---|
| 3,792,307 A | * | 2/1974 | Baker ............................ 315/77 |
| 5,015,918 A | * | 5/1991 | Copeland ................. 362/473 X |
| 5,247,430 A | * | 9/1993 | Schwaller .................... 362/473 |
| 5,661,645 A | * | 8/1997 | Hochstein .................... 363/89 |

* cited by examiner

Primary Examiner—Jessica Han
(74) Attorney, Agent, or Firm—James A. Deland

(57) ABSTRACT

A bicycle power supply circuit is provided whereby an AC voltage from an AC generator mounted on a bicycle is converted to a DC voltage, and the converted DC voltage is provided to an electrical component on the bicycle. The bicycle power supply circuit includes a first input terminal for connecting to a first AC generator output terminal of the AC generator, a second input terminal for connecting to a second AC generator output terminal of the AC generator, a first output terminal for connecting to the electrical component, and a second output terminal for connecting to the electrical component. A full-wave voltage rectifier circuit converts AC voltage presented at the first and second input terminals into a DC voltage, and a storage device is coupled to the voltage rectifier, wherein the storage device has a positive voltage terminal and a negative voltage terminal. The positive voltage terminal is coupled for providing a positive voltage signal to the first output terminal and the negative voltage terminal is coupled for providing a negative voltage signal to the second output terminal.

22 Claims, 8 Drawing Sheets

BICYCLE POWER SUPPLY

BACKGROUND OF THE INVENTION

The present invention is directed to a bicycle power supply and, more particularly, to a bicycle power supply for providing electrical equipment mounted on a bicycle with a voltage produced by an AC generator mounted on the bicycle.

In conventional practice, headlights, taillights, and other types of illumination gear are commonly used as bicycle electrical equipment. Usually, dynamos (AC generators) are mounted on the bicycle to serve as the power supply for such electrical equipment. Currently, however, bicycles are being outfitted with more advanced electrical equipment such as electronically controlled shifters and other mechanisms, and power supplies are needed for the motors, control devices, and other types of electrical equipment used in such equipment. Thus, the power requirements of modern bicycles are becoming quite large.

Not surprisingly, it has been proposed to provide the electric power needed to operate all of the electrical equipment using a dynamo. However, the voltage generated by such a dynamo is an AC voltage, whereas the voltage needed for the electrical equipment is typically a DC voltage. It is therefore necessary to convert the AC voltage produced by the dynamo to a DC voltage. Furthermore, the maximum voltage produced by a dynamo is commonly low (about 8 V) and varies greatly with the travel speed of the bicycle. Thus, if the AC voltage is rectified with a half-wave rectifier circuit, full-wave rectifier circuit, or other type of rectifier circuit commonly used to rectify a 100-V commercial power supply, at some travel speeds it is impossible to provide the electrical equipment with sufficient voltage. Even when a sufficiently powerful voltage can be supplied, the rectified DC voltage varies with the travel conditions, thus making it impossible to provide electrical equipment with stable electric power. A failure to ensure a stable supply of sufficiently powerful voltage makes it more likely that the electrical equipment will malfunction.

SUMMARY OF THE INVENTION

The present invention is directed to a bicycle power supply circuit which provides a sufficiently powerful voltage to accommodate greater power demands of electrical equipment mounted on the bicycle. The present invention also is directed to a power supply which provides a stable voltage.

In one embodiment of the present invention, a bicycle power supply circuit is provided whereby an AC voltage from an AC generator mounted on a bicycle is converted to a DC voltage, and the converted DC voltage is provided to an electrical component on the bicycle. The bicycle power supply circuit includes a first input terminal for connecting to a first AC generator output terminal of the AC generator, a second input terminal for connecting to a second AC generator output terminal of the AC generator, a first output terminal for connecting to the electrical component, and a second output terminal for connecting to the electrical component. A full-wave voltage rectifier circuit converts AC voltage presented at the first and second input terminals into a DC voltage, and a storage device is coupled to the voltage rectifier, wherein the storage device has a positive voltage terminal and a negative voltage terminal. The positive voltage terminal is coupled for providing a positive voltage signal to the first output terminal, and the negative voltage terminal is coupled for providing a negative voltage signal to the second output terminal.

In a more specific embodiment, the voltage rectifier includes a first diode having an anode and a cathode and a second diode having an anode and a cathode. The anode of the first diode and the cathode of the second diode are coupled to the first input terminal. A first storage element has a first terminal coupled to the cathode of the first diode and a second terminal coupled to the second input terminal, and a second storage element has a first terminal coupled to the anode of the second diode and a second terminal coupled to the second input terminal.

With this bicycle power supply, voltage is applied to the full-wave voltage rectifier circuit from the first AC generator output terminal of the AC generator via the first input terminal, and charge is accumulated at maximum voltage in the first storage element during the positive half-periods of the voltage provided by the AC generator. Voltage is also applied to the full-wave voltage rectifier circuit from the second AC generator output terminal of the AC generator via the second input terminal, and charge is accumulated at maximum voltage in the second storage element during negative half-periods. As a result, a voltage +Vc appears at the first output terminal, and a voltage −Vc appears at the second output terminal, where Vc is the voltage of the dynamo appearing across the first and second input terminals. Thus, it is possible to output a voltage that is double the maximum voltage delivered by the AC generator, and sufficiently powerful voltage can be stably fed to electrical equipment even when the bicycle is ridden at a low speed as a result of the first and second storage elements.

In an embodiment of the invention that produces a stable voltage, a bicycle power supply circuit as described above includes a voltage regulator that regulates the voltage across the first and second output terminals at a prescribed value. This may be used also in power supplies that do not provide positive and negative voltages at the output terminals. In one embodiment of such a voltage regulator, a switch is disposed between the first input terminal and a storage device, and a switch control circuit is coupled to the switch, to the first output terminal and to the second output terminal. The switch is adapted to sense a voltage across the first and second output terminals and to selectively switch the switch to an off state. This, in turn, keeps the voltage at the first and second output terminals at the desired value.

In another embodiment of a voltage regulator, a switch is provided for switching off a signal at at least one of the first output terminal and the second output terminal, and a switch control circuit is coupled to the switch, to the first output terminal and to the second output terminal. The switch control circuit is adapted to sense a voltage across the first and second output terminals and to selectively switch the switch to an off state when a voltage across the first and second output terminals is less than a prescribed value. Thus, the voltage regulator shuts off the power supply when the voltage falls below a prescribed value to avoid potentially damaging the electronic components. Also, the power shut-off can reduce the charging time needed to return the voltage at the first and second output terminals to the desired value.

If desired, the storage elements may be capacitances, such as large-value capacitors that allow the charging time to be shortened and dimensions reduced. Alternatively, the storage elements may be rechargeable batteries that have a larger storage capacity than capacitors which, in turn, allow for a longer discharge time.

Another inventive feature is the provision of the power supply circuit in a case member that simulates a commercially available battery case. Such a case can simulate a single commercially available battery or a group of commercially available batteries mounted in a commercially available battery case. In this manner a power supply according to the present invention may be inserted in place of a conventional battery, or a conventional battery may be inserted in place of the power supply in the event the power supply needs servicing or when the rolling resistance caused by the dynamo is undesirable in a particular situation.

DETAILED DESCRIPTION OF THE EMBODIMENTS

Figure 1:
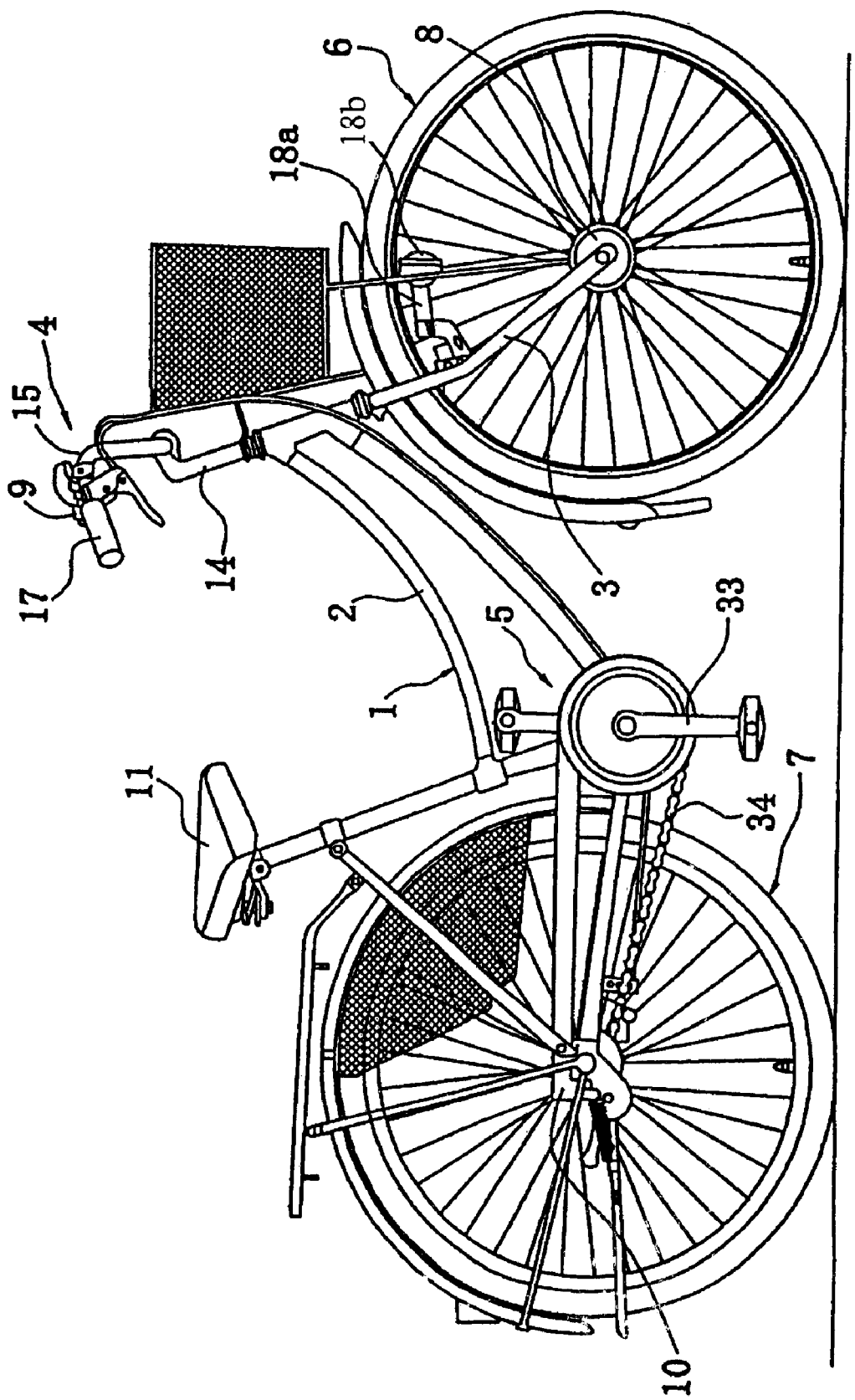
FIG. 1 is a side view of a bicycle that incorporates a particular embodiment of a power supply circuit according to the present invention.

FIG. 1 is a side view of a bicycle that incorporates a particular embodiment of a power supply circuit according to the present invention. The bicycle comprises a frame 1 including a double-loop frame body 2 and a front fork 3, a saddle 11, a handle unit 4, a drive unit 5, a front wheel 6 on which a brake-equipped dynamo hub 8 is mounted, a rear wheel 7 provided with a four-speed internal shifter hub 10, a shift controller 9 for the manual operation of the internal shifter hub 10, and a lamp control unit 18a.

The handle unit 4 comprises a handle stem 14 fixed to the top portion of the front fork 3 and a handle bar 15 fixed to the handle stem 14. A brake lever 16 (FIG. 3) and a grip 17 are mounted on either end of the handle bar 15. The control panel 20 of the shift controller 9 is formed integrally with the right-side brake lever 16.

As shown in FIG. 1, the drive unit 5 comprises a gear crank 33 attached to the lower portion (bottom bracket) of the frame body 2, a chain 34 extending around the gear crank 33, and the internal shifter hub 10. The internal shifter hub 10 is a four-speed internal shifter hub that can be shifted into five positions (four shifting positions and one antitheft position) by a shifting motor 29, which is described below. The rotation of the rear wheel 7 can be restricted or blocked when internal shifter hub 10 is in the antitheft position.

The dynamo hub 8 of the front wheel 6 fixed to the front end of the front fork 3 includes an externally mounted roller-type front brake and serves as an enclosure for an AC generator 19 (FIG. 5) for generating electricity by the rotation of the front wheel 6. The lamp control unit 18a is mounted in the midportion of the front fork 3. The lamp control unit 18a performs a control procedure whereby an integrally mounted lamp 18b is switched on when ambient luminosity falls beyond a prescribed level and is switched off when a certain brightness level is exceeded. The lamp control unit 18a is connected to the AC generator 19.

Figure 2:
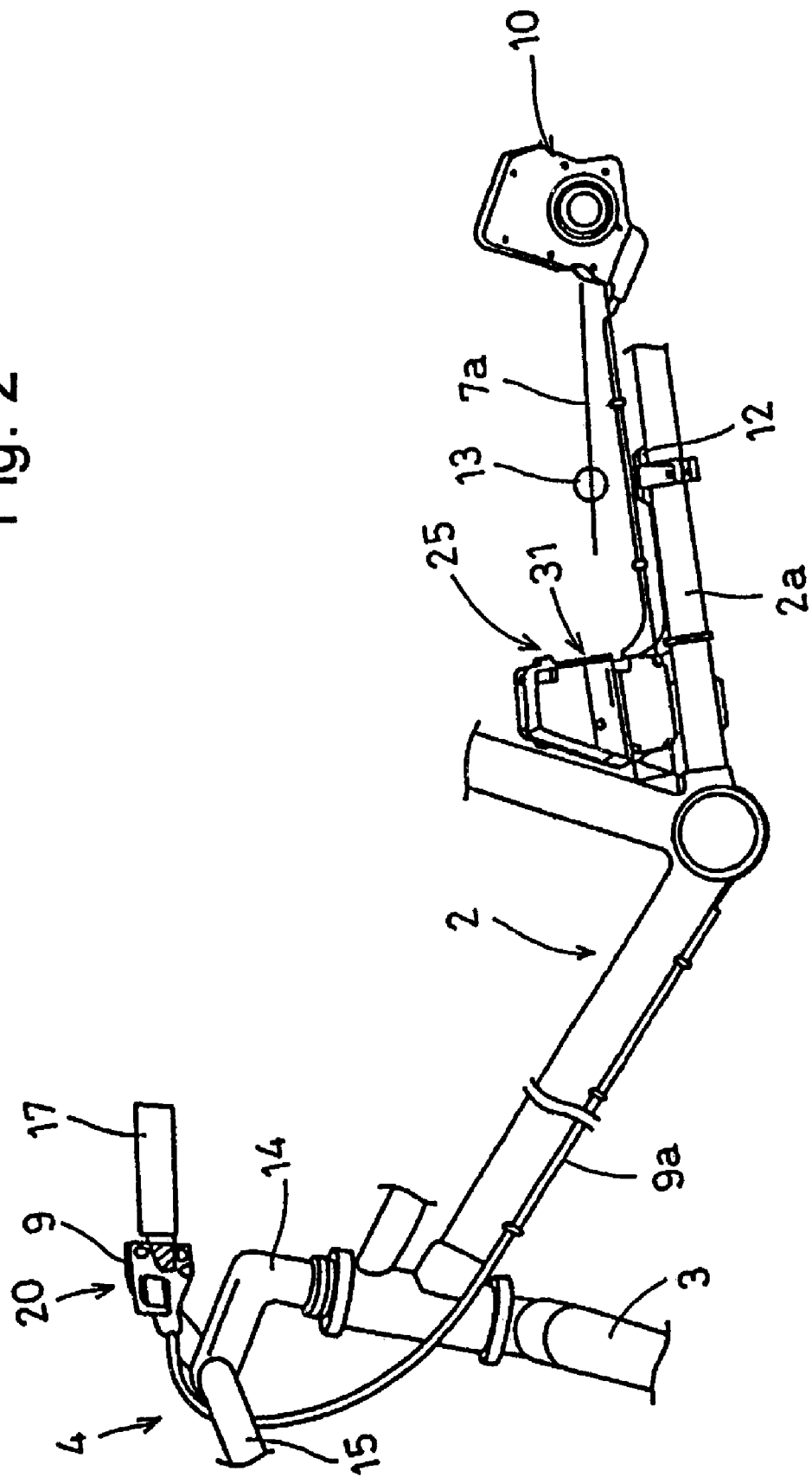
FIG. 2 is a fragmentary side view illustrating a layout of the shift controller used with the bicycle shown in FIG. 1.
Figure 3:
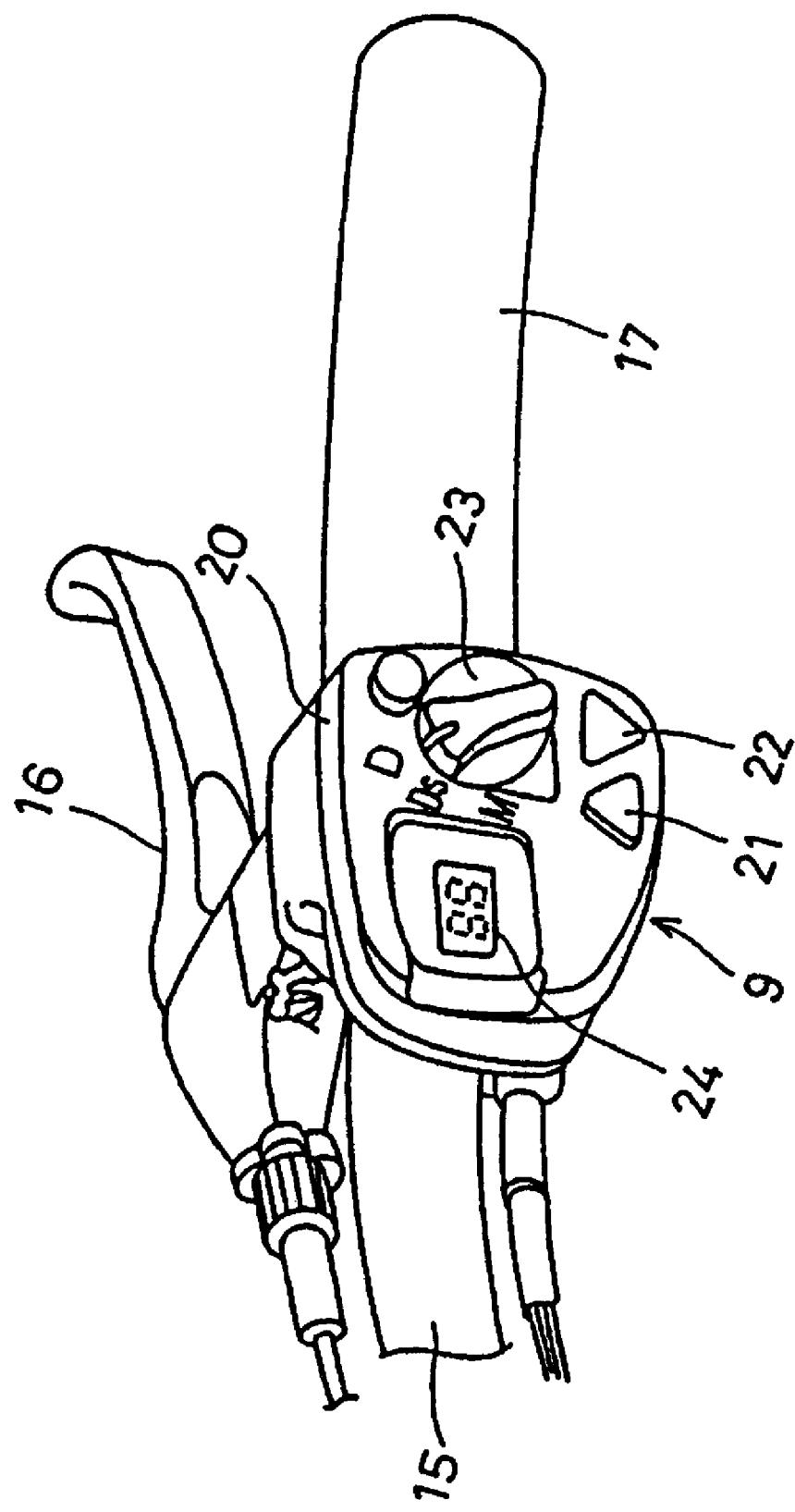
FIG. 3 is a portion of a particular embodiment of a hand operated shift control device used with the bicycle shown in FIG. 1.

As shown in FIG. 3, in this embodiment the shift controller 9 comprises two control buttons 21 and 22 aligned to the right and left in the bottom portion of the control panel 20, a control dial 23 disposed above the control buttons 21 and 22, and a liquid-crystal display 24 disposed to the left of the control dial 23. The shift controller 9 communicates with a shift control unit 25 in a control box 31 (FIG. 2) mounted at the base of the chain stay 2a. The components housed in the control panel 20 are connected to the shift control unit 25 by a control cable 9a. As shown in FIG. 2, a speed sensor 12 provided with an internal lead switch for speed sensing is mounted on the chain stay 2a of the frame body 2. The speed sensor 12 outputs a speed signal to shift controller 9 by sensing a magnet 13 mounted on a spoke 7a of the rear wheel 7.

The control buttons 21 and 22 are triangular pushbuttons. The left-side control button 21 is a downshifting button, and the right-side control button 22 is an upshifting button. The control dial 23, which is used to switch between two shift modes and an antitheft or parking (P) mode, has four stationary positions (P, D, Ds, and M). As referred to herein, the shift modes comprise an automatic shift 1 (D) mode, an automatic shift 2 (Ds) mode, and a manual shift (M) mode. The automatic shift 1 (D) mode and automatic shift 2 (Ds) mode allow the internal shifter hub 10 to be automatically shifted by a speed signal from the speed sensor 12, whereas the manual shift mode (M) allows the internal shifter hub 10 to be shifted by operating the control buttons 21 and 22. The parking mode (P) is used to lock the internal shifter hub 10 and to prevent the rear wheel 7 from rotating. The liquid-crystal display 24 displays the current travel speed and the speed step engaged during shifting.

Figure 4:
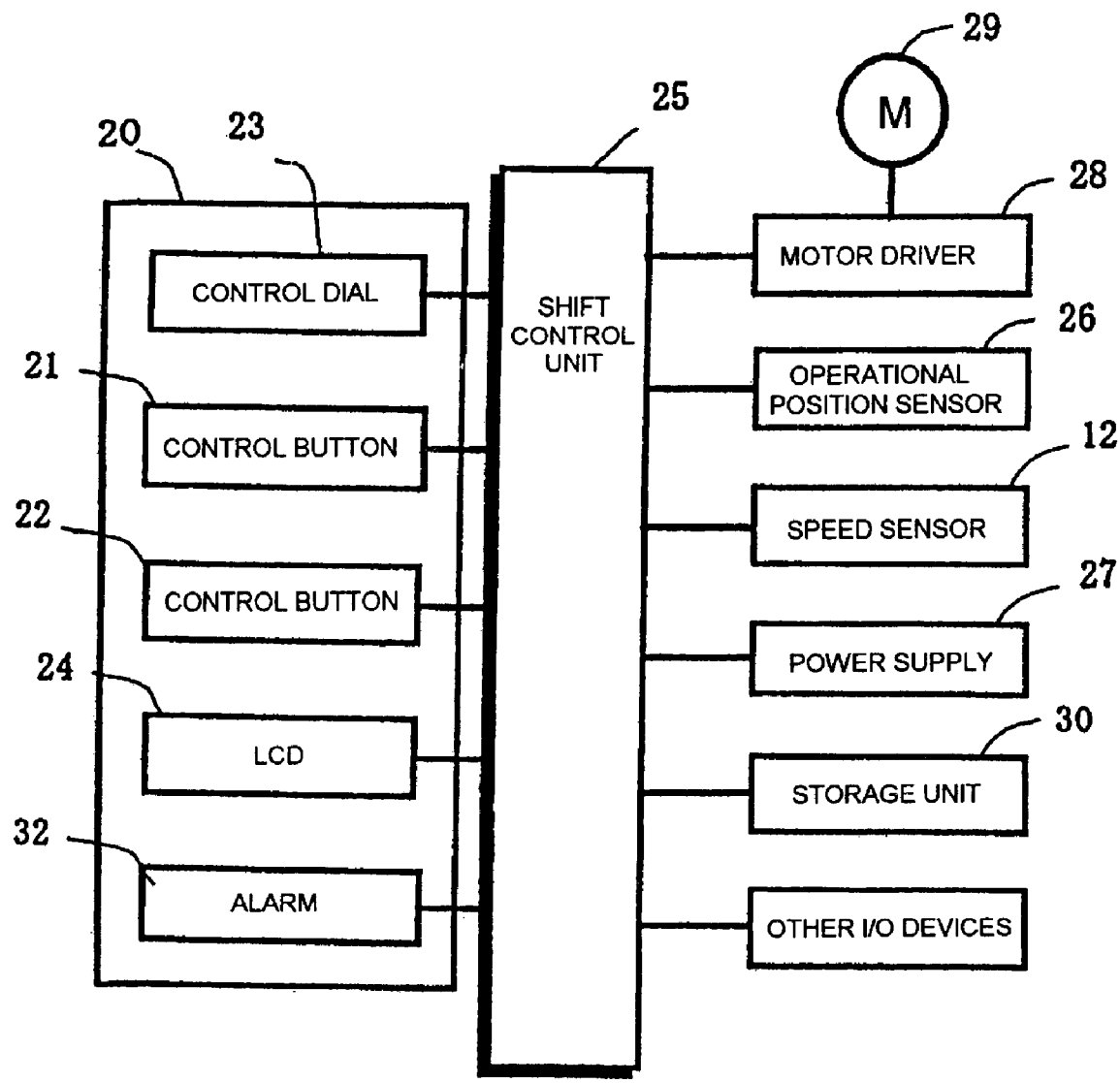
FIG. 4 is a block diagram illustrating a particular embodiment of the electrical components used in the shift controller shown in FIG. 2.

The shift control unit 25 is provided with a microcomputer comprising a CPU, a RAM, a ROM, and an I/O interface. The shift control unit 25 controls the internal shifter hub 10 in accordance with the control operations performed with the control panel 20, as well as the information displayed by the liquid-crystal display 24. As shown in FIG. 4, the control dial 23, the control buttons 21 and 22, the liquid-crystal display 24, and an alarm 32 are connected to the shift control unit 25. Also connected to the shift control unit 25 are, for example, an operating position sensor 26 composed of a potentiometer, a power supply 27 housed in the control box 31, a motor driver 28, a storage unit 30 for storing various types of data, and other input/output devices. A shifting motor 29 for driving the internal shifter hub 10 is connected to the motor driver 28, and the operating position sensor 26 senses the operating position (parking position or one of the four shifting positions) of the shifting motor 29.

Figure 5:
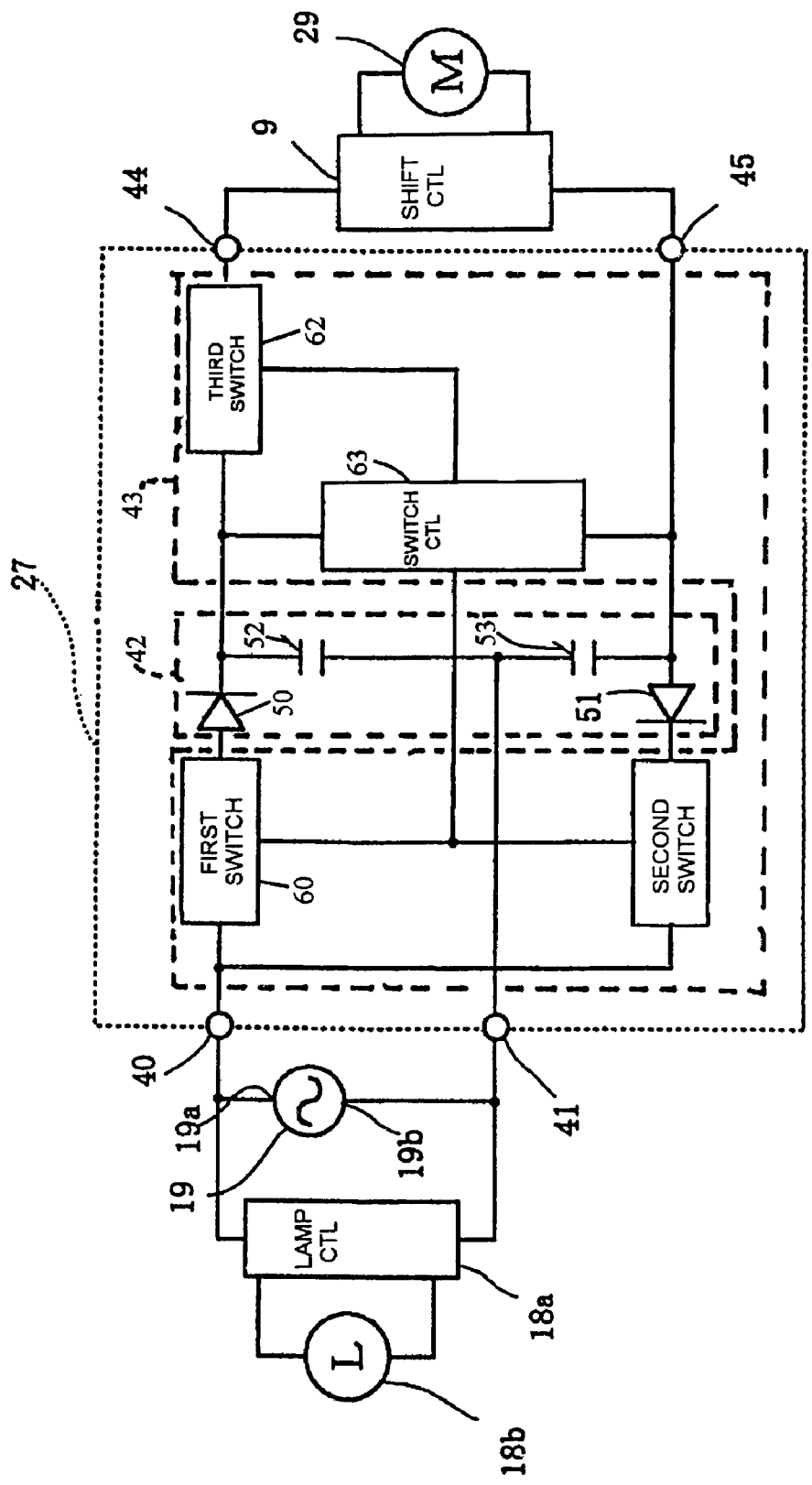
FIG. 5 is a schematic diagram of a particular embodiment of a power supply circuit according to the present invention.
Figure 6:
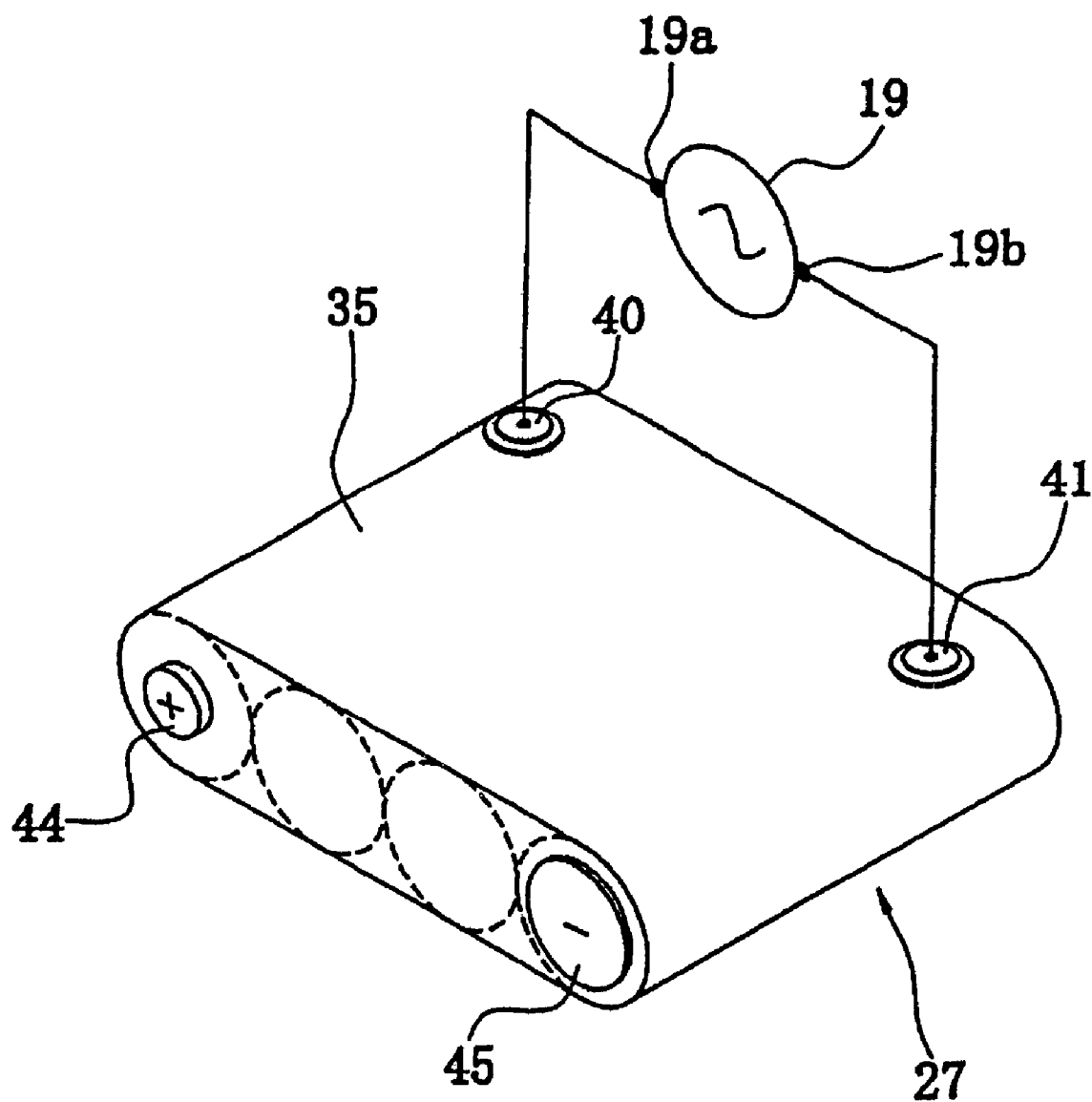
FIG. 6 is an external perspective view of a particular embodiment of a power supply case according to the present invention.

As shown in FIG. 5, the power supply 27 is connected to the AC generator 19 in parallel with the lamp control unit 18a. The power supply 27 converts AC voltage to DC voltage, stores the result, and feeds the stored DC voltage to the shift controller 9. As noted above, power supply 27 is housed in the control box 31. As shown in FIG. 6, the power supply 27 has a case member 35 with an internal housing space and an external shape that conforms to the standard for commercially available batteries. An example is an oval shape capable of accommodating four AA batteries whose positive and negative poles are alternately oriented in opposite directions. Thus, control box 31 can accept either a conventional commercially available battery or a case member 31 according to the present invention. This allows emergency power to be supplied by a commercial battery during a breakdown or other emergency. The case member can also be mounted instead of a battery on an existing control box.

As shown in FIG. 5, the power supply 27 comprises a first input terminal 40, a second input terminal 41, a full-wave voltage rectifier circuit 42, a voltage regulator 43, a first output terminal 44, and a second output terminal 45. As shown in FIG. 6, in this embodiment the first input terminal 40 is disposed on the external peripheral surface of the case member 35, and it is connected to the positive-voltage output terminal 19a of the AC generator 19. Similarly, the second input terminal 41 is disposed on the external peripheral surface of the case member 35 in alignment with the first input terminal 40, and it is connected to the negative-voltage output terminal 19b of the AC generator 19. The first output terminal 44 is located on the case member 35 at a position normally occupied by the positive terminal on a commercially available battery case, and the second output terminal 45 is located on the case member 35 at a position normally occupied by the negative terminal on a commercially available battery case. The shift controller 9 is coupled as a load to the two output terminals 44 and 45.

The full-wave voltage rectifier circuit 42 can store and output an AC voltage that is double the AC voltage presented by the two input terminals 40 and 41. The full-wave voltage rectifier circuit 42 comprises a first diode 50 whose anode terminal is coupled to the first input terminal 40; a second diode 51 whose cathode terminal is coupled to the first input terminal 40; a first storage element 52 in which one end is coupled to the cathode terminal of the first diode 50 and the other end is coupled to the second input terminal 41; and a second storage element 53 in which one end is coupled to the second input terminal 41 and the other end is coupled to the anode terminal of second diode 51. In this embodiment, each of the two storage elements 52 and 53 features an electric double layer capacitor or other large-capacity capacitor and serves to store and smooth the DC voltage rectified by the diodes 50 and 51.

The voltage regulator 43 is an output circuit for keeping the DC voltage produced by the full-wave voltage rectifier circuit 42 at a level not exceeding a first prescribed voltage (for example, 10 V), which is lower than the double voltage. This arrangement makes it possible to protect the storage elements 52 and 53 of the full-wave voltage rectifier circuit 42. The voltage regulator 43 comprises a first switch circuit 60 interposed between the first input terminal 40 and the first diode 50 and designed to make or break the connection between the two; a second switch circuit 61 interposed between the first input terminal 40 and the second diode 51 and designed to make or break the connection between the two; a third switch circuit 62 for switching on or off the DC voltage presented to the first and second output terminals 44 and 45; and a switch control circuit 63 for controlling the switch circuits 60–62. The three switch circuits 60–62 may, for example, feature field-effect transistors or other switching elements that are switched on or off by the control signals from the switch control circuit 63.

Both ends of the switch control circuit 63 are coupled to the first and second output terminals 44 and 45, the voltage between the two output terminals 44 and 45 is sensed, and when the sensed voltage exceeds the first prescribed voltage, the first and second switch circuits 60 and 61 remain switched off for as long as the voltage is above the first prescribed voltage. In addition, the switch control circuit 63 switches off the third switch circuit 62 if the sensed voltage falls below a second prescribed voltage (for example, 4 V), which is lower than the first prescribed voltage.

The operation of the power supply 27 will now be described. With the power supply 27 thus configured, the AC generator 19 starts generating electricity when the bicycle is ridden and the front wheel 6 rotates. Current flows through the first diode 50 via the first switch circuit 60 during the positive half-periods of the input voltage applied from the output terminals 19a and 19b of the AC generator 19, thus charging the first storage element 52 to maximum positive AC voltage (e.g., +Vc). Current flows through the second diode 51 via the second switch circuit 61 during the negative half-periods of the input voltage applied from the output terminals 19a and 19b of the AC generator 19, thus charging the first storage element 52 to maximum negative AC voltage (e.g., −Vc). As a result, the voltage between the two output terminals 44 and 45 (that is, the output voltage) is equal to the combined voltage resulting from the charging of the two storage elements 52 and 53, and the output voltage becomes double the maximum supply voltage of the AC generator 19.

The two switch circuits 60 and 61 are controlled by the switch control circuit 63 to produce a first prescribed voltage below the double supply voltage, so constant voltage less than double the supply voltage is produced. In addition, the third switch circuit 62 is switched off when the bicycle is ridden at a lower speed and the output voltage drops below the second prescribed voltage. This prevents power from being supplied to the shift controller 9 until the system is charged to a voltage equal to or greater than the second prescribed voltage.

The foregoing arrangement allows sufficiently powerful voltage to be applied to the shift controller 9 even when the bicycle is ridden at a low speed because it is possible to deliver double the maximum voltage produced by the AC generator 19, and such voltage is stored in storage elements 51 and 52. In addition, the voltage thus delivered is kept constant by the switch control circuit 63, thus making it possible to provide the shift controller 9 with power whose voltage is stabilized even under variable speed conditions. Consequently, power can be delivered in a secure manner to electrical equipment based on microcomputers.

While the above is a description of various embodiments of the present invention, further modifications may be employed without departing from the spirit and scope of the present invention. For example, although the above embodiment was described with reference to a case in which a dynamo within a hub was used as an AC generator, the present invention is also applicable to cases in which AC voltage is generated by a conventional rim-contacting dynamo in contact with the rim or tire. Although the above embodiment was described with reference to a case in which a shift control device served as the power recipient, the present invention is not limited to this option alone and includes electrical equipment for using electricity to control a bicycle suspension or the like, as well as any other type of electrical equipment for a bicycle.

Although the above embodiment was described with reference to an arrangement in which the case member had an external shape resembling that of a case holding a plurality of AA batteries, the present invention is not limited by this shape alone and may, for example, include shapes resembling those of lithium batteries for cameras or those of other battery types or configurations such as AAA, A, B, C or D type batteries. The case member may also have a shape different from that of a battery and be mounted separately from the electrical equipment.

Figure 7:
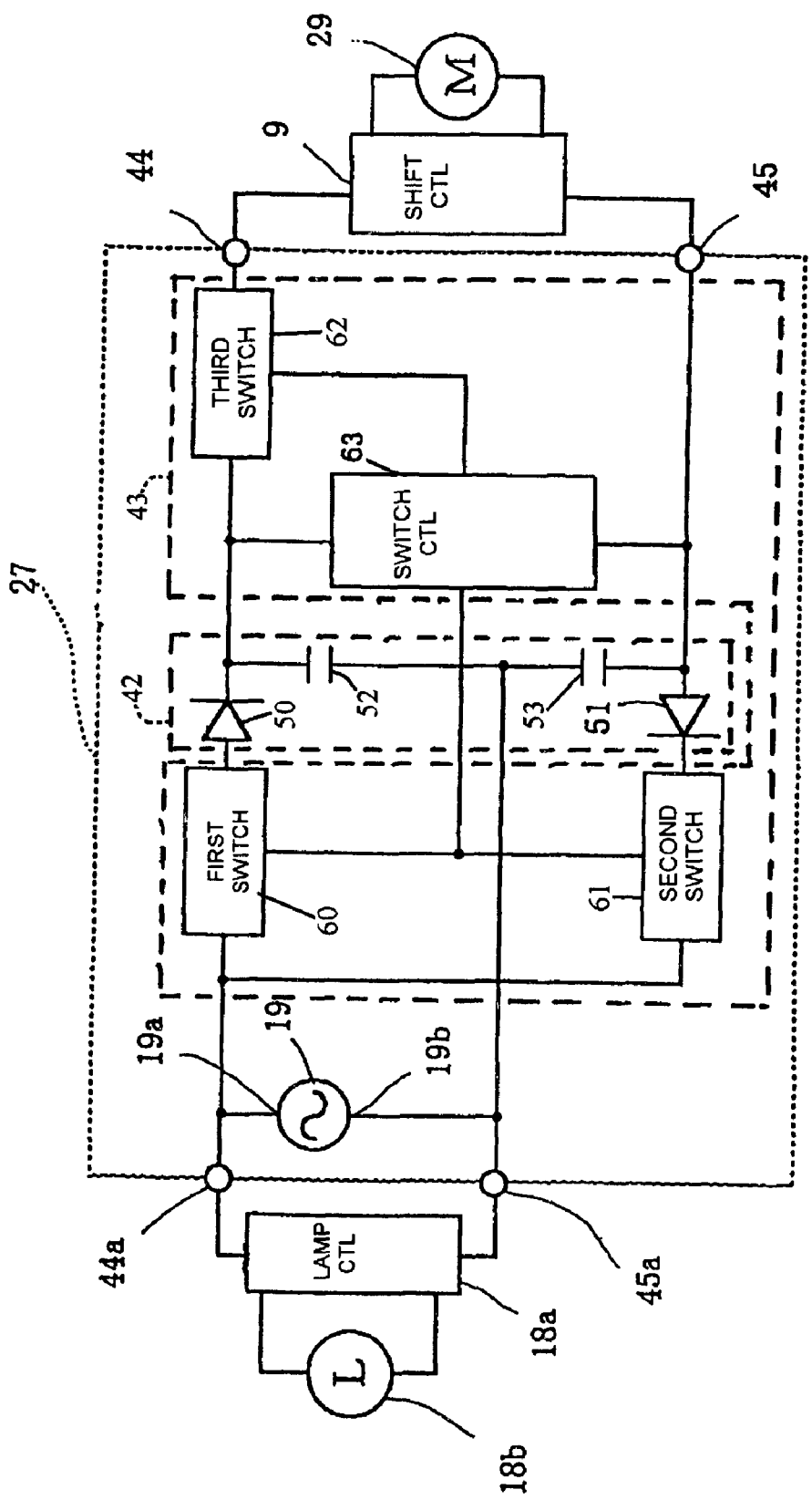
FIG. 7 is a schematic diagram of an alternative embodiment of a power supply circuit according to the present invention.

Although the above embodiment was described with reference to a case in which the power supply was provided separately from the AC generator, the AC generator may also be provided as an integral component in the manner shown in FIG. 7. This arrangement dispenses with the need for the two input terminals, but third and fourth output terminals 44a and 45a for connecting the lamp control unit 18a and delivering an AC output are provided in addition to the first and second output terminals 44 and 45.

Although the above embodiment was described with reference to a case in which a capacitor was used as a storage element, it is also possible to use a nickel-cadmium battery, lithium ion battery, or other secondary battery.

Figure 8:
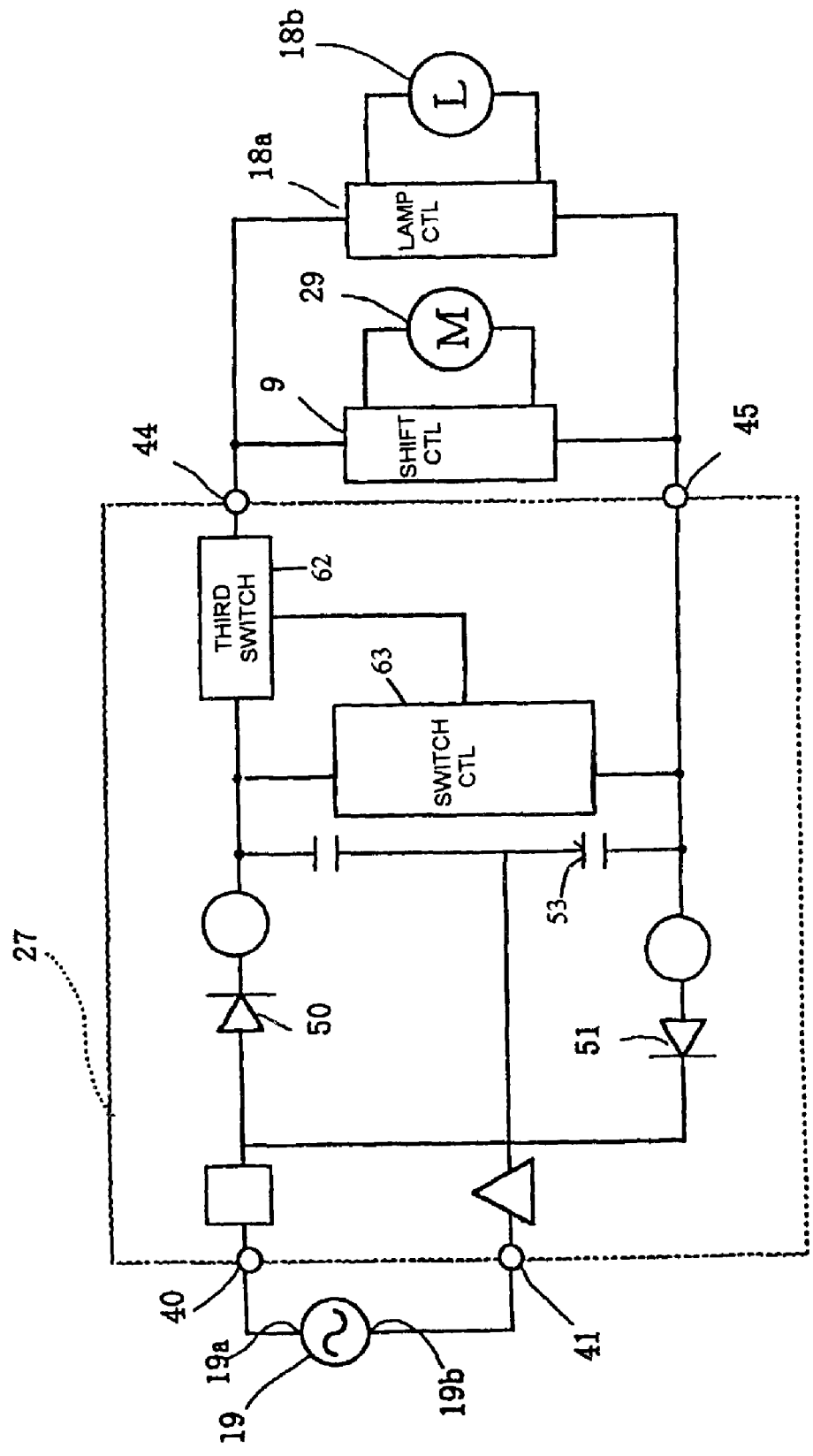
FIG. 8 is a schematic diagram of another alternative embodiment of a power supply circuit according to the present invention.

Although the above embodiment was described with reference to a case in which the first and second switch circuits 60 and 61 of the constant-voltage output means were disposed at positions near the input terminal 40 of the diodes 50 and 51 in the manner shown in FIG. 5, the arrangement and number of these switch circuits are not limited to those adopted in the embodiment. Specifically, the switch circuits can be disposed at positions indicated by the triangle, square, or circles in FIG. 8. Here, the circles indicate the positioning of switch circuits between the storage elements 52 and 53 and the diodes 50 and 51 in accordance with a reverse arrangement relative to the above embodiment. In addition, the square and triangle indicate the positioning of switch circuits between the first input terminal 40 and the bifurcation point between the first input terminal 40 and the diodes 50 and 51, and between the second input terminal 41 at the bifurcation point between the storage elements 52 and 53. A single switch circuit (e.g., square or triangle) can be used when it is positioned facing the input terminal at the bifurcation point in such a manner. Another feature of the present embodiment is that the lamp control unit 18a is arranged in parallel with the shift controller 9 rather than with the AC generator.

Although the above embodiment was described with reference to a case in which the first and second switch circuits 60 and 61 were switched off by the switch circuit 62 when the output voltage exceeded the first prescribed voltage, it is also possible to adopt an arrangement in which the first and second switch circuits 60 and 61 are subjected to Pulse Width Modulation (PWM) control and the first prescribed voltage is maintained.

The size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle power supply circuit whereby an AC voltage from an AC generator mounted on a bicycle is converted to a DC voltage, and the converted DC voltage is provided to an electrical component on the bicycle, the bicycle power supply circuit comprising:

a first input terminal for connecting to a first AC generator output terminal of the AC generator;

a second input terminal for connecting to a second AC generator output terminal of the AC generator;

a first output terminal for connecting to the electrical component;

a second output terminal for connecting to the electrical component;

a full-wave voltage rectifier circuit that converts AC voltage presented at the first and second input terminals into a DC voltage;

a storage device coupled to the voltage rectifier, wherein the storage device includes first and second serially coupled capacitance elements forming a positive voltage terminal and a negative voltage terminal;

wherein the positive voltage terminal is coupled for providing a positive voltage signal to the first output terminal;

wherein the negative voltage terminal is coupled for providing a negative voltage signal to the second output terminal; and a voltage regulator that regulates the voltage across the first and second output terminals at a prescribed value, wherein the voltage regulator comprises:
a switch disposed between the first input terminal and the storage device; and
a switch control circuit coupled to the switch, to the first output terminal and to the second output terminal and adapted to sense a voltage across the first and second output terminals and to selectively switch the switch to an off state.

2. A bicycle power supply circuit whereby an AC voltage from an AC generator mounted on a bicycle is converted to a DC voltage, and the converted DC voltage is provided to an electrical component on the bicycle, the bicycle power supply circuit comprising:

a first input terminal for connecting to a first AC generator output terminal of the AC generator;

a second input terminal for connecting to a second AC generator output terminal of the AC generator;

a first output terminal for connecting to the electrical component;

a second output terminal for connecting to the electrical component;

a full-wave voltage rectifier circuit that converts AC voltage presented at the first and second input terminals into a DC voltage;

a storage device coupled to the voltage rectifier, wherein the storage device has a positive voltage terminal and a negative voltage terminal;

wherein the positive voltage terminal is coupled for providing a positive voltage signal to the first output terminal;

wherein the negative voltage terminal is coupled for providing a negative voltage signal to the second output terminal; and wherein the voltage rectifier comprises:
a first diode having an anode and a cathode;
a second diode having an anode and a cathode;
wherein the anode of the first diode is coupled to the first input terminal;
wherein the cathode of the second diode is coupled to the first input terminal;
a first storage element having a first terminal coupled to the cathode of the first diode and a second terminal coupled to the second input terminal; and a second storage element having a first terminal coupled to the anode of the second diode and a second terminal coupled to the second input terminal.

3. The circuit according to claim 2 further comprising a voltage regulator that regulates the voltage across the first and second output terminals at a first prescribed value.

4. The circuit according to claim 3 wherein the voltage regulator regulates the voltage across the first and second output terminals to less than twice the voltage across the first and second input terminals.

5. The circuit according to claim 3 wherein the voltage regulator comprises:
   a first switch disposed between the first input terminal and the first diode;
   a second switch disposed between the second input terminal and the second diode;
   a switch control circuit coupled to the first switch, to the second switch, to the first output terminal and to the second output terminal and adapted to sense a voltage across the first and second output terminals and to selectively switch at least one of the first switch and the second switch to an off state.

6. The circuit according to claim 5 wherein the voltage regulator selectively simultaneously switches both the first switch and the second switch to an off state.

7. The circuit according to claim 5 wherein the switch control circuit causes at least one of the first switch and the second switch to effect pulse width modulation of the signal received by the first input terminal.

8. The circuit according to claim 5 wherein the voltage regulator comprises a third switch for switching off a signal at at least one of the first and second output terminals.

9. The circuit according to claim 8 wherein the voltage regulator switches the third switch to an off state when a voltage across the first and second output terminals is less than a second prescribed value.

10. The circuit according to claim 9 wherein the first prescribed value is greater than the second prescribed value.

11. The circuit according to claim 3 wherein the voltage regulator comprises a switch for switching off a signal at at least one of the first and second output terminals.

12. The circuit according to claim 11 wherein the voltage regulator switches the switch to an off state when a voltage across the first and second output terminals is less than the first prescribed value.

13. The circuit according to claim 2 wherein the first diode is the only diode directly connected to the first storage element, and wherein the second diode is the only diode directly connected to the second storage element.

14. The circuit according to claim 2 wherein the first storage element comprises a first capacitor, and wherein the second storage element comprises a second capacitor.

15. The circuit according to claim 2 wherein the first storage element comprises a first battery, and wherein the second storage element comprises a second battery.

16. A bicycle power supply circuit whereby an AC voltage from an AC generator mounted on a bicycle is converted to a DC voltage, and the converted DC voltage is provided to an electrical component on the bicycle, the bicycle power supply circuit comprising:
   a first input terminal for connecting to a first AC generator output terminal of the AC generator;
   a second input terminal for connecting to a second AC generator output terminal of the AC generator;
   a first output terminal for connecting to the electrical component;
   a second output terminal for connecting to the electrical component;
   a full-wave voltage rectifier circuit that converts AC voltage presented at the first and second input terminals into a DC voltage;
   a storage device coupled to the voltage rectifier, wherein the storage device has a positive voltage terminal and a negative voltage terminal;
   wherein the positive voltage terminal is coupled for providing a positive voltage signal to the first output terminal;
   wherein the negative voltage terminal is coupled for providing a negative voltage signal to the second output terminal; and
   a case member having a shape corresponding to a commercially available battery case, wherein the full-wave voltage rectifier circuit and the storage device are disposed in the case member, wherein the first output terminal is located at a position corresponding to a first terminal of the commercially available battery case, and wherein the second output terminal is located at a position corresponding to a second terminal of the commercially available battery case.

17. The circuit according to claim 16 wherein the first input terminal and the second input terminal are located on an external surface of the case member and spaced apart from each other.

18. The circuit according to claim 16 wherein the case member has a shape corresponding to a lithium battery case.

19. The circuit according to claim 16 wherein the case member has a shape corresponding to a commercially available battery case containing a plurality of aligned batteries selected from the group consisting of an AAA battery, an AA battery, an A battery, a C battery and a D battery.

20. A bicycle power supply circuit whereby an AC voltage from an AC generator mounted on a bicycle is converted to a DC voltage, and the converted DC voltage is provided to an electrical component on the bicycle, the bicycle power supply circuit comprising:
   a first input terminal for connecting to a first AC generator output terminal of the AC generator;
   a second input terminal for connecting to a second AC generator output terminal of the AC generator;
   a first output terminal for connecting to the electrical component;
   a second output terminal for connecting to the electrical component;
   a fall-wave voltage rectifier circuit that converts AC voltage presented at the first and second input terminals into a DC voltage;
   a storage device coupled to the voltage rectifier, wherein the storage device includes first and second serially coupled capacitance elements forming a positive voltage terminal and a negative voltage terminal;
   wherein the positive voltage terminal is coupled for providing a positive voltage signal to the first output terminal; and
   wherein the negative voltage terminal is coupled for providing a negative voltage signal to the second output terminal.

21. The circuit according to claim 20 further comprising the AC generator having the first AC generator output terminal coupled to the first input terminal and the second AC generator output terminal coupled to the second input terminal.

22. A bicycle power supply circuit whereby an AC voltage from an AC generator mounted on a bicycle is converted to a DC voltage, and the converted DC voltage is provided to an electrical component on the bicycle, the bicycle power supply circuit comprising:
- a first input terminal for connecting to a first AC generator output terminal of the AC generator;
- a second input terminal for connecting to a second AC generator output terminal of the AC generator;
- a first output terminal for connecting to the electrical component;
- a second output terminal for connecting to the electrical component;
- a full-wave voltage rectifier circuit that converts AC voltage presented at the first and second input terminals into a DC voltage;
- a storage device coupled to the voltage rectifier, wherein the storage device includes first and second serially coupled capacitance elements forming a positive voltage terminal and a negative voltage terminal;
- wherein the positive voltage terminal is coupled for providing a positive voltage signal to the first output terminal;
- wherein the negative voltage terminal is coupled for providing a negative voltage signal to the second output terminal;
- a voltage regulator that regulates the voltage across the first and second output terminals wherein the voltage regulator comprises:
  - a switch for switching off a signal to at least one of the first output terminal and the second output terminal; and
  - a switch control circuit coupled to the switch, to the first output terminal and to the second output terminal and adapted to sense a voltage across the first and second output terminals and to selectively switch the switch to an off state when a voltage across the first and second output terminals is less than a prescribed value.

* * * * *